(12) United States Patent
Park et al.

(10) Patent No.: US 12,037,516 B2
(45) Date of Patent: Jul. 16, 2024

(54) POLISHING SLURRY COMPOSITION AND METHOD FOR PRODUCING SAME

(71) Applicant: KCTECH CO., LTD., Gyeonggi-do (KR)

(72) Inventors: Kwang Soo Park, Gyeonggi-do (KR); Jun Ha Hwang, Gyeonggi-do (KR); Soo Wan Choi, Seoul (KR); Nak Hyun Choi, Gyeonggi-do (KR)

(73) Assignee: KCTECH Co., Ltd., Gyeonggi-do (KR)

( * ) Notice: Subject to any disclaimer, the term of this patent is extended or adjusted under 35 U.S.C. 154(b) by 581 days.

(21) Appl. No.: 17/293,236

(22) PCT Filed: May 29, 2019

(86) PCT No.: PCT/KR2019/006413
§ 371 (c)(1),
(2) Date: May 12, 2021

(87) PCT Pub. No.: WO2020/101134
PCT Pub. Date: May 22, 2020

(65) Prior Publication Data
US 2021/0380842 A1    Dec. 9, 2021

(30) Foreign Application Priority Data
Nov. 16, 2018 (KR) .................. 10-2018-0141677

(51) Int. Cl.
*C09G 1/02* (2006.01)
*C08K 3/14* (2006.01)
*C09K 3/14* (2006.01)

(52) U.S. Cl.
CPC . *C09G 1/02* (2013.01); *C09K 3/14* (2013.01)

(58) Field of Classification Search
CPC .................................. C09G 1/02; C08K 3/14

USPC .......................................................... 523/149
See application file for complete search history.

(56) References Cited

FOREIGN PATENT DOCUMENTS

| | | | |
|---|---|---|---|
| CN | 1667026 | A | 9/2005 |
| CN | 1696236 | A | 11/2005 |
| CN | 1737071 | A | 2/2006 |
| CN | 101092543 | A | 12/2007 |
| CN | 106987209 | A | 7/2017 |
| CN | 107033787 | A | 8/2017 |
| KR | 1020050106190 | A | 9/2005 |
| KR | 20160121227 | A | 10/2016 |
| KR | 20170017350 | A | 2/2017 |
| KR | 101715931 | B1 | 3/2017 |
| KR | 2017-0076058 | A * | 7/2017 |
| KR | 20180068426 | A | 6/2018 |
| TW | 200537590 | A | 11/2005 |
| TW | 201638240 | A | 11/2016 |
| TW | 201723136 | A | 7/2017 |
| TW | 201723137 | A | 7/2017 |
| TW | 201832828 | A | 9/2018 |
| WO | WO-2016148409 | A1 * | 9/2016 ............... C09G 1/02 |

OTHER PUBLICATIONS

International Search Report for the International Patent Application No. PCT/KR2019/006413, dated Aug. 28, 2019, 2 pages.

\* cited by examiner

*Primary Examiner* — Deve V Hall
(74) *Attorney, Agent, or Firm* — KDW Firm PLLC

(57) ABSTRACT

The present disclosure relates to a polishing slurry composition and a method of producing the same. The polishing slurry composition according to one embodiment of the present disclosure includes: abrasive particles dispersed so as to have positively-charged particle surfaces; a first dispersant including a nonionic linear polymer; and a second dispersant including an anionic coiling polymer, wherein the polishing slurry composition satisfies the following Expressions 1 and 2: [Expression 1] 4≤log(milling energy)<5; and [Expression 2] 20%≤Primary particle size reduction rate (%)<35%.

22 Claims, 2 Drawing Sheets

POLISHING SLURRY COMPOSITION AND METHOD FOR PRODUCING SAME

CROSS-REFERENCE TO RELATED APPLICATIONS

This application is a continuation of, claims the benefit of and priority to previously filed International Patent Application No. PCT/KR2019/006413, entitled "POLISHING SLURRY COMPOSITION AND METHOD FOR PRODUCING SAME", filed May 29, 2019, which claims priority to Korean Patent Application No. 10-2018-0141677, filed Nov. 16, 2018, which are hereby incorporated by reference in their entireties.

TECHNICAL FIELD

The present disclosure relates to a polishing slurry composition and a method of preparing the polishing slurry composition.

BACKGROUND ART

As semiconductor devices become more diversified and highly integrated, finer pattern formation techniques are being used, and accordingly a surface structure of semiconductor devices becomes more complicated and a step height of surface films also becomes greater. A chemical mechanical polishing (CMP) process is used as a planarization technique for removing a stepped portion of a specific film formed on a wafer in manufacturing of a semiconductor device. The CMP process is, for example, a process for removing an insulating film excessively formed for layer insulation, and is widely used as a process for planarizing an interlayer dielectric (ILD) and an insulating film for shallow trench isolation (STI) to insulate chips from each other and as a process for forming a metal conductive film, for example, a wiring, a contact plug or a via contact. The CMP process is used as a wide-area planarization technique of planarizing a surface of a wafer that is to be processed, by relatively moving the wafer and the polishing pad while supplying a slurry to a contact area between the surface of the wafer and a polishing pad and by mechanically removing an uneven surface of the wafer while chemically reacting the uneven surface in a state in which the surface of the waver and the polishing pad are in contact with each other. In the CMP process, a polishing speed, a planarization degree of a polished surface and incidence of scratches are important, which are determined based on, for example, CMP conditions, types of slurries or types of polishing pads. As a degree of integration increases and a standard of a process becomes stricter, an insulating film with an excessively great stepped portion may need to be quickly planarized. In a single-layered slurry generated by mixing an anionic polymer and an anionic copolymer, a high polishing rate and a selectivity in a high stepped portion may be realized, however, it is difficult to adjust a planarization degree and control dishing in a low stepped portion. Also, there is a high probability of occurrence of scratches due to an intrinsic hardness of abrasive particles.

DISCLOSURE OF INVENTION

Technical Goals

To solve the above-described problems, an aspect of the present disclosure is to provide a polishing slurry composition and a method of preparing the polishing slurry composition that may prevent dishing and scratches from occurring during polishing, may have an excellent polishing rate, and may enhance a planarization degree.

However, aspects of the present disclosure are not limited to the one set forth herein, and other aspects not mentioned herein would be clearly understood by one of ordinary skill in the art from the following description.

Technical Solutions

According to an aspect of the present disclosure, there is provided a polishing slurry composition including: abrasive particles dispersed so that surfaces of the abrasive particles have positive charges; a first dispersant including a nonionic linear polymer; and a second dispersant including an anionic coiling polymer. The polishing slurry composition may satisfy the following Condition expressions 1 and 2:

$4 \leq \log(\text{milling energy}) < 5$; and [Condition expression 1]

$20\% \leq \text{Primary particle size reduction rate (\%)} < 35\%$. [Condition expression 2]

According to an aspect, the abrasive particles may have a primary particle diameter of 10 nanometers (nm) to 40 nm, and a particle size reduction rate of primary particles of the abrasive particles compared to a raw material may range from 20% to 35%.

According to an aspect, the polishing slurry composition may further include a third dispersant including a cationic polymer.

According to an aspect, at least one of bonding of the abrasive particles and the first dispersant, bonding of the abrasive particles and the second dispersant, and bonding of the first dispersant and the second dispersant may be electrostatic bonding.

According to an aspect, the first dispersant including the nonionic linear polymer may include at least one selected from the group consisting of polyethylene glycol, polypropylene glycol, polybutylene glycol, polyvinyl alcohol, polyvinylpyrrolidone, and a polyethylene glycol/polypropylene glycol copolymer.

According to an aspect, the first dispersant including the nonionic linear polymer may have a molecular weight of 400 to 20,000.

According to an aspect, the second dispersant including the anionic coiling polymer may include at least one selected from the group consisting of polyacrylic acid, ammonium polyacrylate, polymethacrylic acid, ammonium polymethacrylate, polyacrylic maleic acid, sulfonic acid, sulfonate, sulfonic acid ester, a sulfonic acid ester salt, phosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

According to an aspect, the second dispersant including the anionic coiling polymer may have a molecular weight of 3,000 to 20,000.

According to an aspect, the first dispersant including the nonionic linear polymer may be included in an amount of 0.001% by weight (wt %) to 10 wt % in the polishing slurry composition, and the second dispersant including the anionic coiling polymer may be included in an amount of 0.001 wt % to 10 wt % in the polishing slurry composition.

According to an aspect, the third dispersant including the cationic polymer may include a cationic polymer that includes two or more ionized cations in a molecular formula and two or more nitrogen atoms activated as cations.

According to an aspect, the cationic polymer may include at least one quaternary ammonium salt selected from the group consisting of poly(diallyldimethyl ammonium chloride); poly[bis(2-chloroethyl) ether-alt-1,3-bis[3-(dimethylamino)propyl]urea]; ethanol, 2,2',2''-nitrilotris-, polymer with 1,4-dichloro-2-butene and N,N,N',N'-tetramethyl-2-butene-1,4-diamine); a hydroxyethyl cellulose dimethyl diallylammonium chloride copolymer; a copolymer of acrylamide and diallyldimethylammonium chloride; a copolymer of acrylamide and quaternized dimethylammoniumethyl methacrylate; a copolymer of acrylic acid and diallyldimethylammonium chloride; an acrylamide-dimethylaminoethyl methacrylate methyl chloride copolymer; quaternized hydroxyethyl cellulose; a copolymer of vinylpyrrolidone and quaternized dimethylaminoethyl methacrylate; a copolymer of vinylpyrrolidone and quaternized vinylimidazole; a copolymer of vinylpyrrolidone and methacrylamidopropyl trimethylammonium; poly(2-methacryloxyethyltrimethyl ammonium chloride); poly(acrylamide 2-methacryloxyethyltrimethyl ammonium chloride); poly[2-(dimethylamino)ethyl methacrylate methyl chloride]; poly[3-acrylamidopropyl trimethylammonium chloride]; poly[3-methacrylamidopropyl trimethylammonium chloride]; poly[oxyethylene(dimethylimino)ethylene (dimethylimino)ethylene dichloride]; a terpolymer of acrylic acid, acrylamide and diallyldimethylammonium chloride; a terpolymer of acrylic acid, methacrylamidopropyl trimethylammonium chloride, and methyl acrylate; a terpolymer of vinylcaprolactam, vinylpyrrolidone, and quaternized vinylimidazole; poly(2-methacryloxyethyl phosphorylcholine-co-n-butyl methacrylate); poly(dimethylaminolethyl acrylate benzyl chloride quaternary salt (PDMAEA-BCQ); and poly(dimethylaminolethyl acrylate methyl chloride quaternary salt (PDMAEA-MCQ).

According to an aspect, the third dispersant including the cationic polymer may have a molecular weight of 3,000 to 20,000.

According to an aspect, the third dispersant including the cationic polymer may be included in an amount of 0.01 wt % to 1 wt % in the polishing slurry composition.

According to an aspect, the abrasive particles may include at least one selected from the group consisting of a metal oxide, a metal oxide coated with an organic material or inorganic material, and the metal oxide in a colloidal phase. The metal oxide may include at least one selected from the group consisting of silica, ceria, zirconia, alumina, titania, barium titania, germania, mangania, and magnesia.

According to an aspect, pH of the polishing slurry composition may range from 3 to 7.

According to an aspect, the polishing slurry composition may have a zeta potential of +30 millivolts (mV) to +60 mV.

According to an aspect, a polishing selectivity of a nitride film or a poly film to an oxide film may range from 10:1 to 700:1 during polishing of a substrate including the oxide film and either the nitride film or the poly film using the polishing slurry composition.

According to an aspect, after polishing of a substrate including a nitride film and a poly film using the polishing slurry composition, an amount of dishing may be less than or equal to 300 angstroms (Å) and a number of scratches may be less than "10".

According to another aspect of the present disclosure, there is provided a method of preparing a polishing slurry composition, the method including: preparing a polishing slurry by mixing abrasive particles dispersed so that surfaces of the abrasive particles have positive charges, a first dispersant including a nonionic linear polymer and a second dispersant including an anionic coiling polymer; and milling the polishing slurry using beads.

According to an aspect, the milling may include milling the polishing slurry at a milling speed of 600 revolutions per minute (rpm) to 1,200 rpm using beads having a diameter of 0.1 millimeters (mm) to 1.2 mm.

According to an aspect, the polishing slurry composition may satisfy the following Condition expressions 1 and 2:

$4 \leq \log(\text{milling energy}) < 5$; and [Condition expression 1]

$20\% \leq \text{Primary particle size reduction rate (\%)} < 35\%$. [Condition expression 2]

According to an aspect, primary particles of the abrasive particles in the polishing slurry composition after the milling may have an average particle diameter of 10 nm to 40 nm, and a particle size reduction rate of the primary particles of the abrasive particles compared to a raw material may range from 20% to 35%.

Effects

According to example embodiments of the present disclosure, a polishing slurry composition may use abrasive particles having a primary particle size controlled through adjustment of milling energy in a milling process and may include two or three types of dispersants having different charges, and thus it is possible to prevent dishing and scratches from occurring during polishing, to have an excellent polishing rate and to enhance a planarization degree.

In addition, according to example embodiments of the present disclosure, in a method of preparing a polishing slurry composition, a primary particle size of abrasive particles may be controlled by adjusting milling energy in a milling process, dishing and scratches occurring during polishing may be prevented based on a reduction in the primary particle size, and a number of processes may decrease, thereby enhancing a productivity.

BEST MODE FOR CARRYING OUT THE INVENTION

Figure 1:
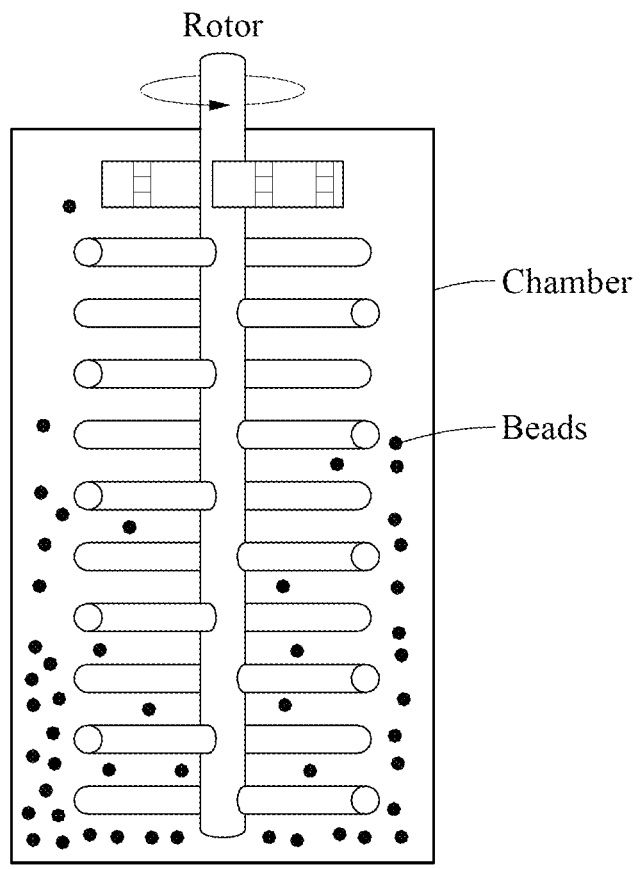
FIG. 1 illustrates a state in which a milling device is filled with beads to describe a bead filling ratio according to the present disclosure.

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

Throughout the specification, when any component is positioned "on" another component, this not only includes a case that the any component is brought into contact with the other component, but also includes a case that another component exists between two components.

It will be understood throughout the whole specification that, when one part "includes" or "comprises" one component, the part does not exclude other components but may further include the other components.

Hereinafter, a polishing slurry composition and a method of preparing the polishing slurry composition will be described in detail with reference to example embodiments and drawings. However, the present disclosure is not limited to the example embodiments and drawings.

According to an example embodiment of the present disclosure, a polishing slurry composition may include abrasive particles dispersed so that surfaces of the abrasive particles have positive charges; a first dispersant including a nonionic linear polymer; and a second dispersant including an anionic coiling polymer. The polishing slurry composition may satisfy the following Condition expressions 1 and 2:

4≤log(milling energy)<5; and    [Conditional expression 1]

20%≤Primary particle size reduction rate (%)<35%.    [Condition expression 2]

The milling energy may be obtained by multiplying a milling speed in revolutions per minute (rpm) of a rotor of a milling device and a bead filling ratio (%) of beads in the milling device, during a milling(pulverization) process when the polishing slurry composition is prepared (milling energy=rotor milling speed (rpm)×bead filling ratio (%)).

FIG. 1 illustrates a state in which a milling device is filled with beads to describe a bead filling ratio according to the present disclosure. The bead filling ratio may represent a number of beads in the milling device as a volume ratio when a volume in a chamber of the milling device is 100%, as shown in FIG. 1.

When the log(milling energy) is less than "4", it may be difficult to prepare particles with an appropriate size due to a low pulverization efficiency. When the log(milling energy) is greater than or equal to "5", even beads may be likely to be worn and impurities caused by abrasion of the beads may be mixed therein, which may cause a large amount of dishing and scratches occurring on a wafer after polishing.

When the primary particle size reduction rate is less than 20%, it may be difficult to prepare a polishing slurry composition to have abrasive particles with a narrow particle size distribution range. When the primary particle size reduction rate is greater than or equal to 35%, even nanoparticles having a size of tens to hundreds of nanometers in addition to large particles may be pulverized into smaller particles, which may lead to uneven particle size distribution. Thus, a wafer may not be uniformly planarized after polishing, and a large amount of dishing and scratches may occur.

The polishing slurry composition according to the present disclosure may satisfy both Condition expressions 1 and 2, and thus it is possible to prevent dishing and scratches from occurring during polishing of a pattern wafer, to have an excellent polishing rate, and to enhance a planarization degree.

According to an aspect, the abrasive particles may have a primary particle diameter of 10 nanometers (nm) to 40 nm, and a particle size reduction rate of primary particles of the abrasive particles compared to a raw material may range from 20% to 35%. By performing a process of milling the polishing slurry composition including the abrasive particles, a particle size may become smaller than the size of the raw material. Thus, the particle size reduction rate may refer to how much the particle size decreases compared to a particle size of the raw material. When the primary particle diameter is less than 10 nm, a polishing rate may decrease. When the primary particle diameter exceeds 40 nm, monodispersibility may not be achieved.

According to an aspect, the abrasive particles may have a secondary particle diameter of 20 nm to 150 nm. When the secondary particle diameter is less than 20 nm in a size of secondary particles in the polishing slurry composition, an excessively large number of small particles may be generated due to milling, to lower cleanability and excessive defects may occur on a surface of a wafer. When the secondary particle diameter exceeds 150 nm, dishing and surface defects such as scratches may be likely to occur because it may be difficult to achieve monodispersibility.

According to an aspect, the first dispersant including the nonionic linear polymer may include at least one selected from the group consisting of polyethylene glycol, polypropylene glycol, polybutylene glycol, polyvinyl alcohol, polyvinylpyrrolidone, and a polyethylene glycol/polypropylene glycol copolymer.

According to an aspect, the first dispersant including the nonionic linear polymer may have a molecular weight of 400 to 20,000. When the molecular weight of the first dispersant including the nonionic linear polymer is out of the above range, dispersibility may decrease which may lead to a decrease in stability and scratches may occur.

The polishing slurry composition according to the present disclosure may include the first dispersant including the nonionic linear polymer, and thus it is possible to improve dishing and scratches occurring during polishing of a pattern wafer.

According to an aspect, the second dispersant including the anionic coiling polymer may include an acrylate-based polymer.

According to an aspect, the second dispersant including the anionic coiling polymer may include at least one selected from the group consisting of polyacrylic acid, ammonium polyacrylate, polymethacrylic acid, ammonium polymethacrylate, polyacrylic maleic acid, sulfonic acid, sulfonate, sulfonic acid ester, a sulfonic acid ester salt, phosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

According to an aspect, the second dispersant including the anionic coiling polymer may have a molecular weight of 3,000 to 20,000. When the molecular weight of the second dispersant including the anionic coiling polymer is out of the above range, dispersibility may decrease which may lead to a decrease in stability, and an oxide film polishing rate may decrease.

The polishing slurry composition according to the present disclosure may include the second dispersant including the anionic coiling polymer, and thus it is possible to enhance dispersibility of a slurry including an abrasive particle-dispersion layer composite.

According to an aspect, the first dispersant including the nonionic linear polymer may be included in an amount of 0.001% by weight (wt %) to 10 wt % in the polishing slurry composition, and the second dispersant including the anionic coiling polymer may be included in an amount of 0.01 wt % to 10 wt % in the polishing slurry composition.

When the amount of the first dispersant is less than 0.001 wt %, it may be difficult to achieve a desired polishing rate. When the amount of the first dispersant exceeds 10 wt %, dispersibility may decrease which may lead to a decrease in stability, and surface defects and scratches may increase during polishing.

When the amount of the second dispersant is less than 0.001 wt %, it may be difficult to achieve a desired polishing rate. When the amount of the first dispersant exceeds 10 wt %, dispersibility may decrease which may lead to a decrease in stability, and surface defects and scratches may increase during polishing.

According to an aspect, the polishing slurry composition may further include a third dispersant including a cationic polymer.

According to an aspect, the third dispersant including the cationic polymer may include a cationic polymer that includes two or more ionized cations in a molecular formula and the cationic polymer may desirably include two or more nitrogen atoms activated as cations.

According to an aspect, the cationic polymer may be in a quaternary ammonium form. For example, the cationic polymer may include at least one selected from the group consisting of poly(diallyldimethyl ammonium chloride); poly[bis(2-chloroethyl) ether-alt-1,3-bis[3-(dimethylamino) propyl]urea]; ethanol, 2,2',2"-nitrilotris-, polymer with 1,4-dichloro-2-butene and N,N,N',N'-tetramethyl-2-butene-1,4-diamine); a hydroxyethyl cellulose dimethyl diallylammonium chloride copolymer; a copolymer of acrylamide and diallyldimethylammonium chloride; a copolymer of acrylamide and quaternized dimethylammoniumethyl methacrylate; a copolymer of acrylic acid and diallyldimethylammonium chloride; an acrylamide-dimethylaminoethyl methacrylate methyl chloride copolymer; quaternized hydroxyethyl cellulose; a copolymer of vinylpyrrolidone and quaternized dimethylaminoethyl methacrylate; a copolymer of vinylpyrrolidone and quaternized vinylimidazole; a copolymer of vinylpyrrolidone and methacrylamidopropyl trimethylammonium; poly(2-methacryloxyethyltrimethylammonium chloride); poly(acrylamide 2-methacryloxyethyltrimethyl ammonium chloride); poly[2-(dimethylamino)ethyl methacrylate methyl chloride]; poly[3-acrylamidopropyl trimethylammonium chloride]; poly[3-methacrylamidopropyl trimethylammonium chloride]; poly[oxyethylene(dimethylimino)ethylene (dimethylimino)ethylene dichloride]; a terpolymer of acrylic acid, acrylamide and diallyldimethylammonium chloride; a terpolymer of acrylic acid, methacrylamidopropyl trimethylammonium chloride, and methyl acrylate; a terpolymer of vinylcaprolactam, vinylpyrrolidone, and quaternized vinylimidazole; poly(2-methacryloxyethyl phosphorylcholine-co-n-butyl methacrylate); poly(dimethylamino)ethyl acrylate benzyl chloride quaternary salt (PDMAEA-BCQ); and poly(dimethylamino)ethyl acrylate methyl chloride quaternary salt (PDMAEA-MCQ).

According to an aspect, the third dispersant including the cationic polymer may have a molecular weight of 3,000 to 20,000. When the molecular weight of the third dispersant including the cationic polymer is out of the above range, it may be difficult to adjust an oxide film polishing rate, and dishing may occur.

The polishing slurry composition according to the present disclosure may include the third dispersant including the cationic polymer, and thus it is possible to enhance a polishing rate and adjust a zeta potential so that the polishing slurry composition may have a positive zeta potential.

According to an aspect, the third dispersant including the cationic polymer may be included in an amount of 0.01 wt % to 1 wt % in the polishing slurry composition. When the amount of the third dispersant is out of the above range, it may be difficult to adjust an oxide film polishing rate, and dishing may occur.

In the polishing slurry composition according to the present disclosure, dispersants surrounding the abrasive particles may form a dispersion layer through electrostatic bonding so that an amount of dispersants adsorbed to the abrasive particles may increase, and hardness of the abrasive particles may be reduced, and lubricity, dispersibility and aggregation of particles may be enhanced.

According to an aspect, at least one of bonding of the abrasive particles and the first dispersant, bonding of the abrasive particles and the second dispersant, and bonding of the first dispersant and the second dispersant may be electrostatic bonding.

According to an aspect, the surfaces of the abrasive particles may exhibit opposite charges to the second dispersant, and the second dispersant may exhibit opposite charges to the third dispersant. Thus, the second dispersant may be electrostatically bonded to the surfaces of the abrasive particles, and the first dispersant that is nonionic may be electrostatically bonded to the surfaces of the abrasive particles or the second dispersant.

According to an aspect, the abrasive particles may include at least one selected from the group consisting of a metal oxide, a metal oxide coated with an organic material or inorganic material, and the metal oxide in a colloidal phase. The metal oxide may include at least one selected from the group consisting of silica, ceria, zirconia, alumina, titania, barium titania, germania, mangania, and magnesia.

The abrasive particles may be present in an amount of 0.1 wt % to 10 wt % in the polishing slurry composition. When the amount of the abrasive particles is less than 0.1 wt %, a polishing speed may decrease. When the amount of the abrasive particles exceeds 10 wt %, defects may be likely to occur due to the abrasive particles.

The abrasive particles may be prepared by a solid-phase method or a liquid-phase method, and may be dispersed so that the surfaces of the abrasive particles may have positive charges, however, there is no limitation thereto. The liquid-phase method may include, for example, a sol-gel method of causing a chemical reaction of abrasive particle precursors in an aqueous solution and of growing crystals to obtain fine particles, or a coprecipitation method of precipitating abrasive particle ions in an aqueous solution, and a hydrothermal synthesis of forming abrasive particles at a high temperature under a high pressure. Also, the solid-phase method may include a method of calcinating abrasive particle precursors at a temperature of 400° C. to 1,000° C.

The abrasive particles may be single crystalline particles, but are not limited thereto. When single crystalline abrasive particles are used, a scratch reduction effect may be achieved in comparison to polycrystalline abrasive particles, dishing may be improved, and cleanability after polishing may be enhanced.

The abrasive particles may have at least one selected from the group consisting of a spherical shape, a square shape, a needle shape and a plate shape, and may desirably have the spherical shape.

The polishing slurry composition according to an example embodiment of the present disclosure may increase an amount of dispersants adsorbed to the abrasive particles, may reduce hardness of the abrasive particles, and may enhance lubricity, aggregation of particles, dispersibility and stability.

According to an aspect, pH of the polishing slurry composition may range from 3 to 7.

Figure 2:
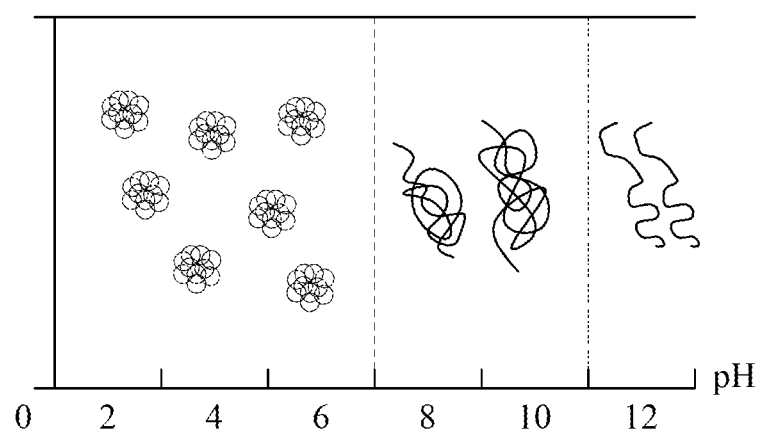
FIG. 2 is a diagram illustrating a behavior based on a pH range of an anionic coiling polymer included in a polishing slurry composition according to the present disclosure.

FIG. 2 is a diagram illustrating a behavior based on a pH range of an anionic coiling polymer included in a polishing slurry composition according to the present disclosure. Referring to FIG. 2, it may be found that a chain of a polymer is maintained in a state of being coiled in a pH range below 7, that a coiled chain gradually loosens from a pH range above 7, and that a coiled chain is completely unfolded in a pH range above 12. This indicates a result based on a strength of a hydrogen bonding inside an anionic coiling polymer. Since hydrogen bonds between coiling polymer chains are actively formed in the pH range below 7 in which hydrogen ions are sufficient, a polymer may be coiled. Since a hydrogen bond between coiling polymer chains is not formed in the pH range above 12 in which hydrogen ions are insufficient, a coiling portion may be completely unfolded.

According to an aspect, the pH of the polishing slurry composition may be adjusted to a range of 3 to 7, thereby enhancing dispersibility of a slurry composition. The pH may be adjusted by adding a pH adjuster.

According to an aspect, the pH adjuster may include at least one selected from the group consisting of nitric acid, sulfuric acid, phosphoric acid, hydrochloric acid, acetic acid, citric acid, glutaric acid, glycollic acid, formic acid, lactic acid, malic acid, malonic acid, maleic acid, oxalic acid, phthalic acid, succinic acid, tartaric acid, ammonium hydroxide, potassium hydroxide, calcium oxide, and magnesium hydroxide.

According to an aspect, the polishing slurry composition may have a zeta potential of +30 mV to +60 mV.

As described above, the zeta potential of the polishing slurry composition according to the present disclosure may be adjusted to be greater than or equal to +30 mV by the third dispersant.

According to an aspect, when a substrate including an oxide film and either a nitride film or a poly film is polished using the polishing slurry composition, a polishing selectivity of the nitride film or the poly film to the oxide film may range from 10:1 to 700:1.

According to an aspect, after polishing of a substrate including a nitride film and a poly film using the polishing slurry composition, an amount of dishing may be less than or equal to 300 angstroms (Å) and a number of scratches may be less than "10".

The polishing slurry composition according to the present disclosure may use abrasive particles having a primary particle size controlled through adjustment of milling energy in a milling process and may include two or three types of dispersants having different charges, and thus it is possible to prevent dishing and scratches from occurring during polishing, to have an excellent polishing rate, and to enhance a planarization degree.

According to another example embodiment of the present disclosure, a method of preparing a polishing slurry composition may include: preparing a polishing slurry by mixing abrasive particles dispersed so that surfaces of the abrasive particles have positive charges, a first dispersant including a nonionic linear polymer and a second dispersant including an anionic coiling polymer; and milling the polishing slurry using beads.

Also, in the method of preparing a polishing slurry composition according to the present disclosure, a primary particle size of the abrasive particles may be controlled by adjusting milling energy in a milling process, dishing and scratches occurring during polishing may be prevented based on a reduction in the particle size, and a number of processes may decrease, thereby enhancing a productivity.

According to an aspect, the milling may include milling the polishing slurry at a milling speed of 600 rpm to 1,200 rpm using beads having a diameter of 0.1 mm to 1.2 mm. When a rotating portion of a milling device performs the milling at the milling speed of 600 rpm to 1200 rpm, abrasive particles that are evenly distributed may be obtained.

According to an aspect, beads may assist milling(pulverization) by transferring impact energy to the abrasive particles during a milling process, and a pulverization yield may be determined based on a particle diameter of the beads and a concentration of the beads in a slurry. A size of beads for filling a milling device which is advantageous in pulverization of particles and a size of the particles may vary depending on, for example, properties of particles to be pulverized, and accordingly it is desirable to experimentally confirm the beads. The beads may include, for example, zirconium oxide beads.

To pulverize abrasive particles having a particle diameter of 45 nm or greater in a polishing slurry composition including the abrasive particles, a first dispersant, a second dispersant and a third dispersant as described above, beads with a diameter of 0.1 mm to 1.2 mm may desirably be used. When an average particle diameter of the beads (based on a volume average) is less than 0.1 mm, it may be difficult to transfer impact energy caused by rotation of a rotating portion to the abrasive particles. When the average particle diameter of the beads (based on the volume average) exceeds 1.2 mm, it may be difficult to obtain primary particles of the abrasive particles that are uniformly distributed due to a transfer of excessive impact energy, and impurities may be mixed therein due to abrasion of the beads and abrasion of an inner wall of a chamber.

According to an aspect, it may desirably be to perform milling using only one type of beads in a diameter range, however, it is possible to use two or more types of beads in the diameter range. In typical high-speed high-energy milling, it is known that beads are severely worn when beads with different sizes are mixed and used. However, since in low-energy milling, abrasion of beads does not matter, it is possible to mix and use beads with different sizes.

According to an aspect, the pulverization yield may be determined based on a concentration of bead particles in the polishing slurry composition in addition to the particle diameter of the beads. Due to the same reason as a reason for limiting the diameter of the beads, a mixing ratio between beads in the polishing slurry composition: an abrasive particle-dispersion layer composite that includes abrasive particles, a first dispersant, a second dispersant and a third dispersant may desirably range from 1:1 to 10:1 based on a mass ratio.

According to an aspect, a flow rate of the polishing slurry composition of milling may be in a range of 10 liters per minute (L/min) to 30 L/min A flow rate of the polishing slurry composition in a milling process may need to be in the same range as the above range, to advantageously obtain uniform abrasive particles.

The method of preparing a polishing slurry composition according to the present disclosure may further include removing large particles through filtration of the milled polishing slurry composition. The filtration may be performed using a filtration method known to one of ordinary skill in the art as a method that is typically used for classifying abrasive particles, and is not particularly limited in the present disclosure. A filtration process may include, for example, a circulation scheme and a passing scheme. The circulation scheme may be a scheme of connecting a pump and a filter to a slurry tank so that a polishing slurry composition continues to circulate, and the passing scheme may be a scheme of installing a pump and a filter between two slurry tanks to enable a repeated transfer.

According to an aspect, the polishing slurry composition may satisfy the following Condition expressions 1 and 2:

4≤log(milling energy)<5;  [Condition expression 1]

20%≤Primary particle size reduction rate (%)<35%.  [Condition expression 2]

When the log(milling energy) is less than "4", it may be difficult to prepare particles with an appropriate size due to a low pulverization efficiency. When the log(milling energy) is greater than or equal to "5", even beads may be likely to be worn and impurities caused by abrasion of the beads may be mixed therein, which may cause a large amount of dishing and scratches occurring on a wafer after polishing.

When the primary particle size reduction rate is less than 20%, it may be difficult to prepare a polishing slurry composition to have abrasive particles with a narrow particle size distribution range. When the primary particle size reduction rate is greater than or equal to 35%, even nanoparticles having a size of tens to hundreds of nanometers in addition to large particles may be pulverized into smaller particles, which may lead to uneven particle size distribution. Thus, a wafer may not be uniformly planarized after polishing, and a large amount of dishing and scratches may occur.

According to an aspect, primary particles of the abrasive particles in the polishing slurry composition after the milling may have an average particle diameter of 10 nm to 40 nm, and a particle size reduction rate of the primary particles of the abrasive particles compared to a raw material may range from 20% to 35%.

The polishing slurry composition according to the present disclosure may satisfy both Condition expressions 1 and 2, and thus it is possible to prevent dishing and scratches from occurring during polishing of a pattern wafer, to have an excellent polishing rate, and to enhance a planarization degree.

Hereinafter, the present disclosure will be described in detail with reference to examples and comparative examples.

However, the following examples are merely illustrative of the present disclosure, and the present disclosure is not limited to these examples.

Preparation of Polishing Slurry Composition 10 wt % of colloidal ceria was used as abrasive particles, 0.5 wt % of polyethylene glycol (PEG) was used as a first dispersant in comparison to the abrasive particles, 0.4 wt % of a polyacrylic acid/styrene copolymer was used as a second dispersant in comparison to the abrasive particles, and picolinic acid was used as a pH adjuster to adjust pH to 4.

Subsequently, a milling process was performed under milling conditions of Table 1, and a filtering process for removing impurities was performed, to prepare a polishing slurry composition with a final solid content of 2.5 wt %.

Examples 1 and 2 and Comparative Examples 1 and 2 were classified according to the milling conditions of Table 1 shown below, using the prepared polishing slurry composition.

TABLE 1

| | Milling conditions | |
|---|---|---|
| | Rotor milling speed (RPM) | Bead filling ratio (%) |
| Comparative Example 1 | 700 | 45 |
| Comparative Example 2 | 635 | 65 |
| Example 1 | 1100 | 45 |
| Example 2 | 1100 | 65 |

Silicon pattern wafers were polished according to Examples 1 and 2 and Comparative Examples 1 and 2 under the following polishing conditions.

[Polishing conditions]
1. Polishing machine: AP-300 (manufactured by CTS)
2. Pad: K7 (manufactured by Rohm & Haas)
3. Polishing time: 60 seconds
4. Platen speed: 93
5. Spindle speed: 87
6. Flow rate: 250 ml/min
7. Wafer pressure: 3.0 psi
8. Used wafers:
PE-TEOS 20,000 Å, LP-Nitride 2,500 Å, P_Doped Poly 3,000 Å
STI Nitride Pattern (Nitride 1,000 Å, HDP 2,000 Å, Trench 1,200 Å)

Table 2 shows milling energy, characteristics of particles in the polishing slurry composition, and polishing characteristics after polishing according to Examples 1 and 2 and Comparative Examples 1 and 2 (milling energy=rotor milling speed (rpm)×bead filling ratio (%)). A particle size represents a size measured by X-ray diffraction (XRD).

TABLE 2

| | Milling energy | | Particle characteristics | | | Polishing characteristics | | | | |
|---|---|---|---|---|---|---|---|---|---|---|
| | Milling energy | Log (milling energy) | Particle size (nm) | Particle size reduction (nm) | Particle size reduction rate (%) | TEOS (Å/min) | Nitride film (Å/min) | Poly film (Å/min) | Dishing (Å) | Scratch |
| Comp. Ex. 1 | 31500 | 4.5 | 39.1 | 5.9 | 13.4 | 2227 | 23 | 16 | 440 | Moderate |
| Comp. Ex. 2 | 41275 | 4.6 | 37.6 | 7.4 | 16.4 | 2319 | 19 | 18 | 398 | Moderate |
| Ex. 1 | 49500 | 4.7 | 30.9 | 14.1 | 31.3 | 2044 | 44 | 20 | 133 | Tolerable |
| Ex. 2 | 71500 | 4.9 | 33.3 | 11.7 | 26.0 | 2148 | 24 | 17 | 295 | Tolerable |

* Particle size of abrasive particle raw material (HC-60): 45 nm

*Scratch evaluation criteria: tolerable (less than 10 scratches), moderate (less than 30 scratches), severe (less than 50 scratches)

Referring to Table 2, it may be confirmed that Examples 1 and 2 satisfy both the range of log(milling energy) in Condition expression 1 and the range of the particle size reduction rate in Condition expression 2. Comparative Examples 1 and 2 correspond to the range of log(milling energy) in Condition expression 1, but do not correspond to the range of the particle size reduction rate in Condition expression 2. In the case of Comparative Examples 1 and 2, it may be found that incidence of scratches on a substrate after polishing is high and that a dishing-inhibiting ability based on an oxide film polishing rate is reduced to exhibit large amounts of dishing that are 440 Å and 398 Å, respectively. On the contrary, in the case of Examples 1 and 2, it may be confirmed that scratches on a substrate after polishing were evaluated as "tolerable" because the number of scratches is less than ten, and that small amounts of dishing that are 133 Å and 295 Å, respectively, occurred.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

The invention claimed is:

1. A polishing slurry composition comprising:
   abrasive particles dispersed so that surfaces of the abrasive particles have positive charges;
   a first dispersant comprising a nonionic linear polymer; and
   a second dispersant comprising an anionic coiling polymer,
   wherein the polishing slurry composition satisfies the following Condition expressions 1 and 2:

$4 \leq \log(\text{milling energy}) < 5$; and  [Condition expression 1]

$20\% < \text{Primary particle size reduction rate (\%)} < 35\%$.  [Condition expression 2]

2. The polishing slurry composition of claim 1, wherein the abrasive particles have a primary particle diameter of 10 nanometers (nm) to 40 nm, and
   a particle size reduction rate of primary particles of the abrasive particles compared to a raw material ranges from 20% to 35%.

3. The polishing slurry composition of claim 1, further comprising:
   a third dispersant comprising a cationic polymer.

4. The polishing slurry composition of claim 1, wherein at least one of bonding of the abrasive particles and the first dispersant, bonding of the abrasive particles and the second dispersant, and bonding of the first dispersant and the second dispersant is electrostatic bonding.

5. The polishing slurry composition of claim 1, wherein the first dispersant comprising the nonionic linear polymer comprises at least one selected from the group consisting of polyethylene glycol, polypropylene glycol, polybutylene glycol, polyvinyl alcohol, polyvinylpyrrolidone, and a polyethylene glycol/polypropylene glycol copolymer.

6. The polishing slurry composition of claim 1, wherein the first dispersant comprising the nonionic linear polymer has a molecular weight of 400 to 20,000.

7. The polishing slurry composition of claim 1, wherein the second dispersant comprising the anionic coiling polymer comprises at least one selected from the group consisting of polyacrylic acid, ammonium polyacrylate, polymethacrylic acid, ammonium polymethacrylate, polyacrylic maleic acid, sulfonic acid, sulfonate, sulfonic acid ester, a sulfonic acid ester salt, phosphoric acid, phosphate, phosphoric acid ester, a phosphoric acid ester salt, an acryl/styrene copolymer, a polyacrylic acid/styrene copolymer, a polyacrylamide/acrylic acid copolymer, a polyacrylic acid/sulfonic acid copolymer, and a polyacrylic acid/maleic acid copolymer.

8. The polishing slurry composition of claim 1, wherein the second dispersant comprising the anionic coiling polymer has a molecular weight of 3,000 to 20,000.

9. The polishing slurry composition of claim 1, wherein the first dispersant comprising the nonionic linear polymer is included in an amount of 0.001% by weight (wt %) to 10 wt % in the polishing slurry composition, and
   the second dispersant comprising the anionic coiling polymer is included in an amount of 0.001 wt % to 10 wt % in the polishing slurry composition.

10. The polishing slurry composition of claim 3, wherein the third dispersant comprising the cationic polymer comprises a cationic polymer that comprises two or more ionized cations in a molecular formula and two or more nitrogen atoms activated as cations.

11. The polishing slurry composition of claim 10, wherein the cationic polymer comprises at least one quaternary ammonium salt selected from the group consisting of poly (diallyldimethyl ammonium chloride); poly[bis(2-chloroethyl) ether-alt-1,3-bis[3-(dimethylamino)propyl]urea]; ethanol, 2,2',2''-nitrilotris-, polymer with 1,4-dichloro-2-butene and N,N,N',N'-tetramethyl-2-butene-1,4-diamine); a hydroxyethyl cellulose dimethyl diallylammonium chloride copolymer; a copolymer of acrylamide and diallyldimethylammonium chloride; a copolymer of acrylamide and quaternized dimethylammoniumethyl methacrylate; a copolymer of acrylic acid and diallyldimethylammonium chloride; an acrylamide-dimethylaminoethyl methacrylate methyl chloride copolymer; quaternized hydroxyethyl cellulose; a copolymer of vinylpyrrolidone and quaternized dimethylaminoethyl methacrylate; a copolymer of vinylpyrrolidone and quaternized vinylimidazole; a copolymer of vinylpyrrolidone and methacrylamidopropyl trimethylammonium; poly(2-methacryloxyethyltrimethylammonium chloride); poly(acrylamide 2-methacryloxyethyltrimethyl ammonium chloride); poly[2-(dimethylamino)ethyl methacrylate methyl chloride]; poly[3-acrylamidopropyl trimethylammonium chloride]; poly[3-methacrylamidopropyl trimethylammonium chloride]; poly[oxyethylene(dimethylimino)ethylene (dimethylimino)ethylene dichloride]; a terpolymer of acrylic acid, acrylamide and diallyldimethylammonium chloride; a terpolymer of acrylic acid, methacrylamidopropyl trimethylammonium chloride, and methyl acrylate; a terpolymer of vinylcaprolactam, vinylpyrrolidone, and quaternized vinylimidazole; poly(2-methacryloxyethyl phosphorylcholine-co-n-butyl methacrylate); poly[(dimethylamino) ethyl acrylate benzyl chloride quaternary salt (PDMAEA- BCQ); and poly[(dimethylamino)ethyl acrylate methyl chloride quaternary salt (PDMAEA-MCQ).

12. The polishing slurry composition of claim 3, wherein the third dispersant comprising the cationic polymer has a molecular weight of 3,000 to 20,000.

13. The polishing slurry composition of claim 3, wherein the third dispersant comprising the cationic polymer is included in an amount of 0.01 wt % to 1 wt % in the polishing slurry composition.

14. The polishing slurry composition of claim 1, wherein
the abrasive particles comprise at least one selected from the group consisting of a metal oxide, a metal oxide coated with an organic material or inorganic material, and the metal oxide in a colloidal phase, and
the metal oxide comprises at least one selected from the group consisting of silica, ceria, zirconia, alumina, titania, barium titania, germania, mangania, and magnesia.

15. The polishing slurry composition of claim 1, wherein pH of the polishing slurry composition ranges from 3 to 7.

16. The polishing slurry composition of claim 1, wherein the polishing slurry composition has a zeta potential of +30 millivolts (mV) to +60 mV.

17. The polishing slurry composition of claim 1, wherein a polishing selectivity of a nitride film or a poly film to an oxide film ranges from 10:1 to 700:1 during polishing of a substrate comprising the oxide film and either the nitride film or the poly film using the polishing slurry composition.

18. The polishing slurry composition of claim 1, wherein after polishing of a substrate comprising a nitride film and a poly film using the polishing slurry composition, an amount of dishing is less than or equal to 300 angstroms (Å) and a number of scratches is less than "10".

19. A method of preparing a polishing slurry composition, the method comprising:
preparing a polishing slurry by mixing abrasive particles dispersed so that surfaces of the abrasive particles have positive charges, a first dispersant comprising a nonionic linear polymer and a second dispersant comprising an anionic coiling polymer; and
milling the polishing slurry using beads.

20. The method of claim 19, wherein the milling comprises milling the polishing slurry at a milling speed of 600 revolutions per minute (rpm) to 1,200 rpm using beads having a diameter of 0.1 millimeters (mm) to 1.2 mm.

21. The method of claim 19, wherein the polishing slurry composition satisfies the following Condition expressions 1 and 2:

$$4 < \log(\text{milling energy}) < 5; \text{ and} \qquad [\text{Condition expression 1}]$$

$$20\% < \text{Primary particle size reduction rate (\%)} < 35\%. \qquad [\text{Condition expression 2}]$$

22. The method of claim 21, wherein
primary particles of the abrasive particles in the polishing slurry composition after the milling have an average particle diameter of 10 nanometers (nm) to 40 nm, and
a particle size reduction rate of the primary particles of the abrasive particles compared to a raw material ranges from 20% to 35%.

* * * * *